United States Patent Office 2,845,408
Patented July 29, 1958

2,845,408
LINEAR POLYMERIC AMIDES AND METHODS OF MAKING THEM

Sidney Melamed, Philadelphia, Pa., assignor to Rohm & Haas Company, Philadelphia, Pa., a corporation of Delaware No Drawing. Application August 4, 1954
Serial No. 447,890

6 Claims. (Cl. 260—89.7)

This invention relates to new linear polymers and methods of producing them and it is particularly concerned with resinous polymers of an acrylamide type which contain side chains or groups having one or more primary or secondary basic nitrogen atoms having a reactive hydrogen bonded thereto.

The new linear resinous polymeric compounds of the present invention comprise from 1 to 100 mole percent of amide units having the structure of one of the general Formulas I, II, and III as follows:

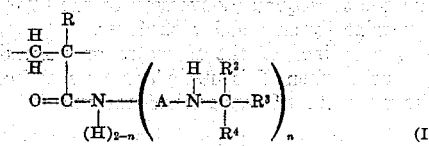

(I)

in which R is H or $CH_3$, $R^2$ is H or an alkyl or hydroxyalkyl group of 1 to 24 carbon atoms, $R^3$ is an alkyl or hydroxyalkyl group of 1 to 24 carbon atoms, or an aryl, alkaryl, or aralkyl group having 6 to 24 carbon atoms, $R^4$ is an alkyl or hydroxyalkyl group of 1 to 24 carbon atoms or an aryl, alkaryl, or aralkyl group having 6 to 24 carbon atoms, $n$ is an integer having a value of 1 to 2, A is an alkylene group of 2 to 10 carbon atoms, an alkyleneoxyalkyl group of 4 to 10 carbon atoms or a (polyalkyleneoxy)alkyl group of 4 to 10 carbon atoms,

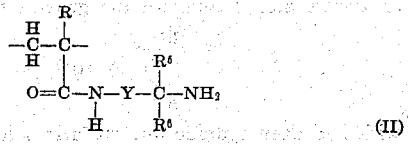

(II)

in which R is defined above, Y is an alkylene group of 1 to 10 carbon atoms, $R^5$ is an alkyl group of 1 to 18 carbon atoms, $R^6$ is an alkyl group of 1 to 18 carbon atoms, and

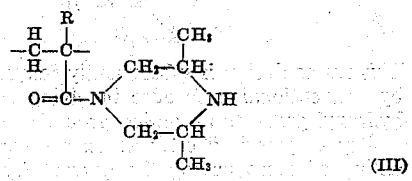

(III)

in which R is defined above.

These new polymeric compounds are solid resinous products having at least five monomeric units of the type defined having one of the Formulas I, II, or III. Generally, the polymers contain from 20 to 20,000 monomeric units of which at least five contain groups having a basic nitrogen atom carrying reactive hydrogen. The polymers are of linear character in the sense that they are not cross-linked although they may contain numerous branches from the linear backbone. The linear backbone or chain consists substantially entirely of direct carbon-to-carbon linkages, there being no intervening or interrupting non-carbon atoms except in the terminal units of the polymer. The polymers contain primary or secondary basic nitrogen atoms in side chains or branch groups and such atoms are connected to the linear backbone by alkyleneamido linkages which may or may not contain one or more ether oxygen atoms.

The compounds have numerous uses. Their basic nitrogen atoms carrying reactive hydrogen widen their field of utility and provide reactive centers adapting the compounds to be thermoset or insolubilized, such as by formaldehyde and other reactants, and also to be converted into many highly useful derivatives as will be more particularly pointed out hereinafter. The amide linkage contributes to water-solubility when the polymers are of water-soluble or water-dispersible character and tends to reduce hydrophobicity where a water-insoluble polymer is involved. The amide linkages may also provide an additional point of formaldehyde reactivity when a reactive hydrogen is carried on the nitrogen of this linkage. The amide group also enhances the resistance of the polymer to the tendency of hard water to deactivate the polymer when it is of a type having bactericidal properties. It is possible that this is accomplished by a sequestering or chelating action.

It has been discovered in accordance with the present invention that the new polymers may be made by the aminolysis of a polymeric ester of an α,β-unsaturated monocarboxylic acid with certain polyamines, especially diamines and triamines, in which the basic nitrogen atoms are of primary or secondary character and one only of these nitrogen atoms is a primary or secondary nitrogen attached exclusively to primary carbon or is a primary nitrogen attached to a secondary carbon atom. It follows from this that if the other of these nitrogen atoms is primary, it or they must be attached to a tertiary carbon, and if secondary, it or they may be attached to (1) a primary carbon and a secondary carbon, (2) a primary carbon and a tertiary carbon, (3) two secondary carbons, or (4) two tertiary carbons.

These polyamines react, in effect, as monoamines in the aminolysis, the first-mentioned nitrogen atom being the only one which becomes attached to a carbonyl group of the polymeric ester to form an amide. The other nitrogen atoms are apparently sterically hindered from reacting similarly. The polyamines which react in this fashion to produce polyamides of linear type have the structure of one of the Formulas IV, V, and VI following:

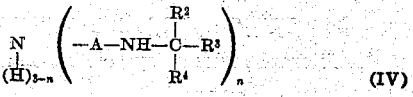

(IV)

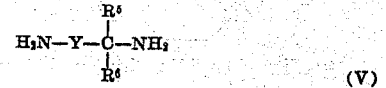

(V)

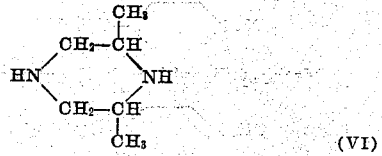

(VI)

in which formulas, the symbols have the same definitions as are given hereinbefore. Examples of the diamines are as follows:

t-Butylaminopropylamine
$(CH_3)_3CNH(CH_2)_3NH_2$

Isopropylaminopropylamine
$(CH_3)_2CHNH(CH_2)_3NH_2$ t-Butylaminoethylamine
$(CH_3)_3CNH(CH_2)_2NH_2$ Isopropylaminoethylamine $(CH_3)_2CHNH(CH_2)_2NH_2$ t-Butylaminopentylamine $(CH_3)_3CNH(CH_2)_5NH_2$ Isopropylaminopentylamine $(CH_3)_2CHNH(CH_2)_5NH_2$ t-Butylaminodecylamine $(CH_3)_3CNH(CH_2)_{10}NH_2$ Isopropylaminodecylamine $(CH_3)_2CHNH(CH_2)_{10}NH_2$ t-Butylaminoethoxyethoxyethylamine $(CH_3)_3-CNHC_2H_4OC_2H_4OC_2H_4NH_2$ 2,6-dimethylpiperazine

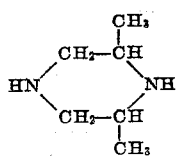

2-amino-1-(1,1,4,4-tetramethylbutylamino)butane

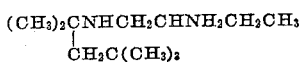

Tris-(hydroxymethyl)methylaminopropylamine $(HOCH_2)_3CNH(CH_2)_3NH_2$ (Benzyldimethyl)methylaminodecylamine $C_6H_5CH_2C(CH_3)_2NH(CH_2)_{10}NH_2$ (Benzyldimethyl)methylaminoethoxyethylamine $(C_6H_5CH_2)_2C(CH_3)NHC_2H_4OC_2H_4NH_2$ (ω-Hydroxydecyldimethyl)methylaminopropylamine $HO(CH_2)_{10}C(CH_3)_2NH(CH_2)_3NH_2$ (Heneicosyldimethyl)methylamino-
ethoxyethoxyethylamine $C_{21}H_{43}C(CH_3)_2NH(C_2H_4O)_2C_2H_4NH_2$ (Benzyldimethyl)methylaminohexylamine $C_6H_5CH_2C(CH_3)_2NH(CH_2)_6NH_2$ 1-(1-cyclohexylethylamino)-2-amino-propane $C_6H_{11}CH(CH_3)NHCH_2CHNH_2CH_3$ (p-Chlorophenyldimethyl)methylaminopropylamine

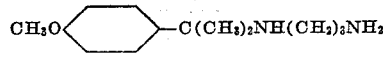

(p-Nitrophenyldimethyl)methylaminopropylamine

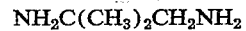

(p-Methoxyphenyldimethyl)methylaminopropylamine

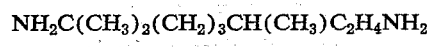

1,2-diamino-2-methyl-propane $NH_2C(CH_3)_2CH_2NH_2$ 1,7-diamino-3,7-dimethyl-octane $NH_2C(CH_3)_2(CH_2)_3CH(CH_3)C_2H_4NH_2$ 1-amino-8-(3-aminopropylamino)-p-menthane

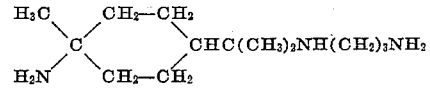

The amines corresponding to Formula IV may be made by conventional procedures of monocyanoethylation or monocyanomethylation of tertiary alkyl carbinamines having the formula

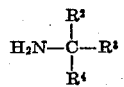  (VII)

in which the $R^2$, $R^3$, and $R^4$ are as defined above to produce the corresponding cyanoalkylamine having the formula

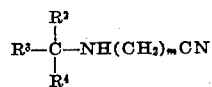

where $m$ is 1 or 2 and subsequently reducing the nitrile group by the conventional procedures to an amine thereby producing products having the general formula

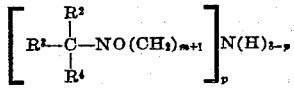

where $p$ is 1 or 2.

Other members of the class defined by Formula IV may be made by the reaction of alkylenechlorohydrines with an amine of Formula VII in conventional fashion and the subsequent conversion of the hydroxyl group to an amine by standard procedures.

The amines of the structure of Formula V may be prepared when Y is methylene by reacting an imine of the structure of the general formula

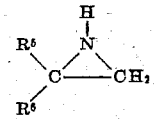

in conventional fashion with ammonia or a primary amine, such as methyl amine, in the presence of aluminum chloride to open up the ring and to produce the corresponding diamine of Formula V. The other diamines of Formula V in which Y may be an alkylene group of 2 to 10 carbon atoms are prepared by treating an unsaturated alcohol of the general formula

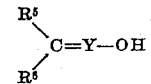

with hydrogen cyanide and sulfuric acid in conventional fashion to produce an amino-alcohol of the general formula

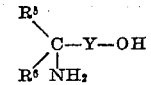

This aminoalcohol is subsequently converted to a diamine by conventional procedure involving conversion of the hydroxyl group to an amino group.

Any polymerized ester of an acid of the group consisting of those having the general formula $$CH_2:C(R)COOR^7 \qquad (VIII)$$

in which R is hydrogen or a methyl group and $R^7$ is the residue of any alcohol, such as an alkyl group having 1 to 24 carbon atoms or an aralkyl (or substituted aralkyl) group having 7 to 24 carbon atoms, may be aminolyzed by any of the polyamines above. The alkyl esters of acrylic or methacrylic acid are preferred, such as those in which the alkyl group is methyl, ethyl, propyl, isopropyl, n-butyl, sec-butyl, t-butyl, amyl, hexyl, heptyl, octyl, decyl and dodecyl.

The polymer to be aminolyzed may be a homopolymer of the ester (Formula VIII) or it may be a copolymer of one or more of such esters with one or more other monoethylenically unsaturated polymerizable compounds, such as acrylonitrile, the vinyl aromatic compounds, more particularly the vinyl aromatic hydrocarbons (e. g. styrene, isopropenyl toluene, methyl styrene, the various dialkyl styrenes, etc.), the various substituted acrylonitriles (e. g. methacrylonitrile, ethacrylonitrile, phenylacrylonitrile, etc.), acrylamide and the various substituted acrylamides (e. g. methacrylamide, ethacrylamide, the various N-substituted acrylamides which are different from those used in practicing the present invention and the various N-substituted alkacrylamides, for instance N-monoalkyl and -dialkyl acrylamides and methacrylamides, e. g., N-monomethyl, -ethyl, -propyl, -butyl, etc. and N-dimethyl, -ethyl, -propyl, -butyl, etc., acrylamides and methacrylamides, N-dialkylaminoalkyl acrylamides or methacrylamides, such as N-dimethylaminoethylacrylamide, N-monoaryl and -diaryl acrylamides and alkacrylamides, e. g., N-monophenyl and -diphenyl acrylamides and methacrylamides, etc.), vinyl esters (e. g. vinyl acetate, vinyl propionate, vinyl butyrate, vinyl isobutyrate, vinyl valerate, etc., esters of the various other alpha-substituted acrylic acids, e. g. ethacrylic acid, phenylacrylic acid, etc.), more particularly the alkyl, e. g., the ethyl, propyl, isopropyl, n-butyl, isobutyl, sec-butyl, tert-butyl, amyl, hexyl, heptyl, octyl, decyl, dodecyl, etc. esters of ethacrylic, phenylacrylic, etc. acids containing a single $CH_2=C<$ grouping.

Depending upon the particular comonomer selected, the polymer obtained may be changed from water-soluble to oil-soluble, to alcohol-soluble or to any combination of these solubilities.

A polymer of methyl acrylate, either a homopolymer or a copolymer, is the preferred polymeric starting material because of the ease and rapidity with which aminolysis may be effected with any of the polyamines of the structure of Formulas IV, V, and VI hereinabove. Generally, aminolysis is performed in a medium which is anhydrous or contains but little water unless considerable carboxyl groups are desired in the final polymeric product. The polyamine itself may serve as the solvent as well as the reactant for aminolyzing the polymerized methyl acrylate and aminolysis may be effected at temperatures of 90° to 130° C. in a time of 96 hours to 24 hours respectively, the time required generally being inversely proportional to the temperature. In the presence of a 3-to-4-fold excess of polyamine, complete aminolysis may be effected in the times and the temperatures just mentioned, and it has been found that the higher the temperature employed, the higher is the final molecular weight of polymer obtained. A catalyst to accelerate the reaction is unnecessary, but an alkoxide, such as sodium methoxide, sodium ethoxide, or the like, may be used in amounts of from ½ to 2% by weight of the polymer. With a catalyst, an amount of the polyamine equivalent to the ester groups to be aminolyzed may be dissolved in a solvent such as toluene or additional polyamine, either the same or different, or an alcohol, such as methanol, ethanol, or butanol, and the complete aminolysis may be obtained in eight hours at a temperature of 80° to 90° C. An advantageous system is to start in toluene in which the polymerized ester is soluble and during the reaction to add an alcohol such as methanol, ethanol, or butanol in which the aminolyzed polymer is soluble, and subsequently to remove the solvent to obtain the final polymer.

The polymeric esters of alcohols other than methyl, such as of ethyl alcohol, propyl alcohol, butyl alcohol, and so on, require an increase in the time and temperature factor to produce a corresponding conversion of ester groups to amido groups in the polymer. Generally, when the polyamine used contains a primary nitrogen atom, it is necessary to maintain the reaction medium containing the polymeric ester and polyamine at a temperature below 130° C. in order to avoid imide formation with consequent cross-linking and insolubilization of the final polymer. However, when the aminolysis is effected by an amine containing only secondary nitrogen atoms, there is no appreciable cross-linking or imide formation even at higher temperatures up to 180° to 200° C.

Polymerized esters of methacrylic acid are more difficult to aminolyze and when a polyamine containing a primary nitrogen atom is used for this purpose, it is difficult to get aminolysis of 60% to 100% of the ester groups without cross-linking. Generally, however, the aminolysis may be effected at temperatures of 180° to 200° C. for three to seven hours with production of uncrossed-linked products which are up to 60% aminolyzed. Generally to get a larger proportion of the ester groups or all thereof in the polymer aminolyzed, a 5-to-10-fold excess of polyamine may be reacted at a temperature of 130° C. for a time of from four to seven days. Alternatively, an alkoxide catalyst may be used with 2-to-4-fold excess amine or an amount of polyamine equivalent to the ester groups to be aminolyzed may be used at 130° C.

As the alkyl group of the ester increases in size, more drastic conditions are necessary to effect aminolysis; thus, when polymerized methyl methacrylate is replaced with polymerized ethyl methacrylate longer times and higher temperatures must be used. As already stated, imide formation may be prevented by the use of polyamines which contain only secondary nitrogen atoms.

The difference in reactivity of these various esters makes it possible to obtain for all practical purposes a selective aminolysis of copolymers containing different ester units. For example, when the final linear polymeric compound desired to be produced is one containing methyl methacrylate as comonomer units, a copolymer of methyl acrylate and methyl methacrylate in appropriate proportions may serve as a starting material so that aminolysis converts the ester groups of the methyl acrylate units to amide units without affecting the ester units of the methyl methacrylate to any considerable extent. Such an aminolysis, for example, may be effected at 80° to 120° C. in the presence of an amount of a polyamine which is equivalent to the ester groups in the methyl acrylate portion of the copolymer. Similarly, if it is desired to produce a copolymer containing one or more comonomers of non-ester type listed above, such as of styrene, a corresponding copolymer, as of styrene and methyl acrylate, may be used as the starting material in which the proportion of acrylate units corresponds to the number of acrylamide units desired and all such acrylate units may be converted to amide groups in the aminolysis.

The conventional procedure for making amides by reacting a halide, such as the chloride, of the corresponding polymeric organic acid cannot be employed to make the polyamides of the present invention because the polyamine cross-links the polymer. Similarly reaction of the polyamine with the chloride of the polymerizable acid in monomeric form produces a diamide or triamide which contains two or three ethylenically unsaturated points in the molecule and on polymerization, cross-linking takes place. It is both surprising and unexpected therefore that the polyamines above react with the polymerized esters without cross-linking them. The aminolysis procedure of the present invention avoids the use of organic acid chlorides which have lachrymatory properties and may often be difficult or unpleasant to make or handle. While it practically always leaves some free carboxyl groups in the aminolyzed polymers unless extreme care is taken to maintain strictly anhydrous conditions during the reaction, the carboxyl groups can be avoided when anhydrous conditions are strictly maintained. However, it has been found that in practical operations where a small amount of water is present, the polymeric product obtained by the aminolysis step contains from 0.1 to 10 molar percent of carboxyl groups.

The properties of the copolymers depend on the character of the basic nitrogen groups and also on the properties and character of any other comonomer or comonomers present in the product. Various solubilities are obtainable. For example, the polymer obtained by the aminolysis of polymerized methyl acrylate to the extent of at least 20% of its ester groups with 1,2-diamino-2-methyl propane can be neutralized with an inorganic acid, such as sulfuric or hydrochloric acid to produce a water-soluble salt. A similar polymer derived from polymerized methyl methacrylate requires at least 30% of the ester groups to be aminolyzed with the same diamine in order to produce corresponding water-solubility. By providing long chain groups either on the nitrogen of the amide or in a comonomer with the amide units, oil solubility may be obtained. Generally all of the water-soluble and oil-soluble polymers are also alcohol-soluble except those having a large proportion of very long chains.

The new polymers and derivatives thereof are useful for many purposes. Thus, they serve as bactericides, fungicides; antistatic agents for treatment of hydrophobic plastic materials such as cellulose esters, cellulose acetate, vinyl resins, etc. in form of fibers, filaments, films, yarns, fabrics; for absorption of acid ions from liquids, such as oils or aqueous solutions; for flocculating suspended matter in aqueous systems, as an aid in clarification and filtration thereof; as aggregating agents for conditioning soil to facilitate the growth of plants, as dispersants, softening agents for cellulosic textiles or films, especially rayon, cellulose acetate, and cotton; as thickeners of coating compositions, such as latex or similar dispersions of polymers, especially of elastomeric type; as modifying components of film-forming materials, to improve the dyeing and resistance to gas-fading of fibers, filaments, films, textiles, and other shaped articles, formed therefrom, particularly of cellulose acetate and acrylonitrile polymers containing at least 75% acrylonitrile in the polymer molecule, especially when a common solvent, such as dimethylformamide or dimethylacetamide is used to prepare a spinning or extrusion dope containing the film-forming polymer and the dye-modifying polymer; as anchoring agents, especially for addition to paper pulp or cellulosic pulps on which they are selectively absorbed and to which they are adapted to anchor acidic materials, such as copolymers of acrylic or methacrylic acid with other vinyl monomers as is described in McLaughlin, Serial No. 410,450, filed February 15, 1954, now United States Patent 2,765,229; as a pharmaceutical, especially for fungicidal and bactericidal purposes; also to isolate protein fractions by forming an insoluble complex and regenerating the protein.

For use as non-phytotoxic bactericidal fungicides, the polymers of the invention are preferably reacted with agents for quaternizing the nitrogen atoms. For this purpose, a preferred group of the compounds of the invention are those of controlled water-solubility which contain 30% to 70% of quaternary N-containing monomeric units in which the average number of carbons on the monomeric units containing a quaternary group are from 10 carbons to 40 carbons.

The N-aminoalkyl-polyacrylamides of the present invention undergo numerous reactions to give useful products difficult to obtain in other ways. For example, reaction of acetyl chloride with the product of complete aminolysis of poly-(methylacrylate) by N-isopropyl-aminopropylamine (herein designated as polymer A) produces an amide derivative which forms tough, flexible coatings. Reaction of this polymer A with stearoyl chloride produces an oil-soluble polymer which depresses the pour point of oils when added in amounts of ½ to 5% by weight. Reaction of $CH_3SO_2Cl$ with polymer A produces sulfonamides having film-forming properties. Reaction of

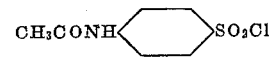

with polymer A produces a long-acting bacteriostatic polymeric sulfonamide. Alkylene diisocyanates, such as ethylene diisocyanate, may be mixed with the polymers, such as polymer A, and reacted after extrusion, coating, casting, or other types of shaping operation by baking with or without a catalyst, to produce cross-linked, infusible materials of rubbery properties. Reaction with monoisocyanates produces ureides which react with aldehydes, etc., such as formaldehyde, to form infusible hard products. Reaction occurs with alkylene oxides, such as propylene oxide, ethylene oxide, and mixtures thereof. For example, reaction of polymer A with ethylene oxide produces water-soluble surfactants having wetting, dispersing and/or emulsifying properties. Reaction with cyanogen chloride produces cyanamides. Cross-linked polymers are also obtained by reacting the polymers, such as polymer A, with aldehydes, especially formaldehyde and acetaldehyde. Reaction of the polymers including polymer A with $(C_2H_5O)_2POCl$ produces derivatives having in all cases a reduced susceptibility to fire and in many cases a material that is capable of fireproofing inflammable articles, when incorporated therein or coated thereon in proper proportions.

The new polymers of the invention may be compounded with dyes, pigments, mold lubricants, fillers, plasticizers and other resinous materials and shaped by conventional molding techniques, such as compression molding, injection molding, casting, extrusion, etc., into articles of any shape desired, including rods, tubes, bars and so on. Examples of other resins that may be incorporated include thermoplastic vinyl and acrylic types of polymers, polyamides of the nylon type, polyesters, such as polyethylene terephthalate, polyethylene, thermosetting reaction products, such as those of the phenol-formaldehyde, urea-formaldehyde, melamine-formaldehyde, thiourea-formaldehyde types, and the polyepoxide resins. For example, a mixture of a polymer of the present invention with an epoxide-containing polymer, especially a polymer of glycidyl acrylate, in relative amounts of each from 5 to 95% and vice versa is useful as a coating, casting, or molding composition. Even a small amount of either component cross-links the other component to form insoluble, infusible, thermoset products.

The following examples are illustrative of the invention:

*Example 1*

(a) There is charged into a reaction vessel 43 g. (½ mole) of a homopolymer of methyl acrylate (whose 50% solution in toluene at 25° C. had a Gardner-Holdt viscosity of Z4+(ca. 75 poises) and 116 g. of 3-isopropylaminopropylamine. The mixture is heated 4 days at 100° C. The solution is then diluted with methanol (300 ml.) and passed through a column of an ion-exchange resin in the acid form to absorb excess unreacted amine but not the polymer. The solution is stripped by heating at 100° C. for about 8 hours under vacuum to an ultimate pressure of ½ mm. of Hg. absolute. The solid product obtained amounted to 67 g. and contained 14.3% nitrogen which corresponds to 88% aminolysis. It is soluble in water, methanol, ethanol, and dimethylformamide.

The product has bactericidal and fungicidal properties. When added to a solution in dimethylformamide of a copolymer containing about 90% acrylonitrile and 10% methylacrylate, in an amount of 5% to 10% on the weight of the acrylonitrile polymer, fibers and other articles extruded or otherwise formed from the solution have improved dyeability, particularly with acid dyes.

(b) The product of part (a) hereof is dissolved in dimethylformamide containing one mole of pyridine per mole of basic nitrogen in the polymer. Then diethyl chlorophosphate in the amount of one mole per mole of basic nitrogen is added to the solution and the mixture is heated to 20°–30° C. for eight hours. The resultant solution of polymeric amidophosphate is separated from the pyridine hydrochloride and the polymer may be isolated by precipitation with petroleum ether. The polymer is dissolved in methanol to form a 10% solution which is applied, as by padding, to a cotton fabric. On drying, the fabric has reduced flammability and retains a soft handle.

*Example 2*

There is charged into a reaction vessel 86 g. of polymerized methyl acrylate (having a viscosity at 25° C. of 75 poises as a 20% solution in ethyl acetate) and 130 grams of 3-(t-butylamino)propylamine to which is added 260 g. of dimethylformamide. The solution is heated at 128° C. for 48 hours. The volatiles are removed by heating in vacuum and the residue is dissolved in methanol and freed of unreacted amine by passage through an ion-exchange resin. The resulting solution is evaporated to dryness. It has a total nitrogen content of 10.1% corresponding to 48% aminolysis. It is soluble in water and lower alcohols. It is insoluble in petroleum hydrocarbons.

It is highly effective as a flocculating agent for aqueous suspensions of clays, soils, acid-leached ores, and suspended solids in crude sugar solution. For this purpose, it is preferably used as a concentration of 0.01 to ½%, based on solids.

*Example 3*

The procedure of Example 1(b) is followed except that the chlorophosphate is replaced with stearoyl chloride and the solution is heated at 80° C. for about 12 hours. The polymer in the resulting solution is precipitated by pouring it into water. The polymer is then dissolved in benzene and added to hydrocarbon oils in amounts of about ½ to 5% of polymer on the weight of the oil. The resulting lubricating oils have their pour-point depressed by the added polymer and have improved detersive properties.

*Example 4*

The procedure of Example 1(a) is followed except that the methyl polyacrylate was replaced by the same amount of a copolymer of 30 mole percent of methyl acrylate and 70 mole percent of 2-ethylhexylacrylate and the diamine was replaced by the same amount of 1,2-diamino-2-methyl-propane. The resulting polymer contained about 28 mole percent of amide groups or units which are believed to have replaced the methyl acrylate groups preferentially. The product is insoluble in water, but soluble in benzene.

(b) The product (one mole) of part (a) hereof is dissolved in dimethylformamide and sufficient ethylene oxide is added to give a product with a cloud-point of about 60° C. when a 1% solution thereof in water is gradually heated. This required approximately 16 moles of ethylene oxide per mole of basic nitrogen. The resulting material is a good detergent, dispersing agent and emulsifier.

*Example 5*

(a) A mixture of methyl polyacrylate (3 moles) with 2,6-dimethylpiperazine (9 moles) is heated at 150° C. for 12 hours. Excess amine is evaporated under vacuum. The resulting polymer is substantially completely aminolyzed. It is dissolved in dimethylformamide (40% solution) and ethyl isocyanate (one mole per mole of amine nitrogen) is added. Reaction starts spontaneously and the mixture is heated to 50° C. for 4 hours to complete the reaction. The polymer comprising the following units

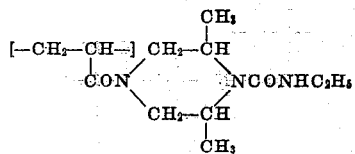

in the dimethylformamide solution is coated on surfaces of metal, glass, wood, and so on and subsequently baked at 150° C. for 10 minutes. It gives tough, flexible thermoplastic films.

(b) To a second portion of the polymer solution formaldehyde (20% by weight of the polymer) and butyl acid phthalate (4% by weight of the polymer) are added. The mixture is coated on panels of metal, wood, and glass and baked at 150° C. for ten minutes. The resulting coating is tough, flexible, but is thermoset and insoluble in organic solvents.

*Example 6*

The procedure of Example 1(a) is followed except that the polyamine is replaced by t-butylaminopentylamine. An oil-soluble polyamide is obtained.

*Example 7*

The procedure of Example 2 is followed except that the polyamine is replaced by isopropylaminodecylamine.

*Example 8*

The procedure of Example 2 is followed except that the polymerized ester is replaced by a copolymer of 30 mole percent of methyl acrylate and 70 mole percent of lauryl methacrylate and the polyamine used is (benzyldimethyl)methylaminohexylamine. The product is oil-soluble and the addition of 1% by weight thereof to a lubricating oil served effectively as a pour-point depressing agent.

*Example 9*

The procedure of Example 8 is followed except that the polyamine is replaced by (heneicosyldimethyl) methylaminoethoxyethoxyethylamine. The product obtained had 95% of its methylacrylate ester groups aminolyzed and is an efficient pour-point depressant in oils.

*Example 10*

(a) The procedure of Example 8 is followed except that the polyamine is replaced by (p-methoxyphenyldimethyl)-methylaminopropylamine.

Aminolysis products in which the methyl acrylate units are substantially completely aminolyzed are similarly obtained when this polyamine is replaced by:

Tris-(hydroxymethyl)methylaminopropylamine,
t-Butylaminopropoxypropylamine,
(ω-Hydroxydecyldimethyl)methylaminopropylamine,
1,7-diamino-3,7-dimethyl-octane, and
1-amino-8-(3-aminopropylamino)-p-menthane.

(b) The several products obtained in part (a) hereof are reacted with 20 moles of ethylene oxide per mole of basic nitrogen in the respective copolymers. The resulting products are surface active detergents.

It is to be understood that changes and variations may be made without departing from the spirit and scope of the invention as defined in the appended claims.

We claim:

1. A composition of matter comprising a linear polymer the main chain of which consists entirely of carbon atoms, said polymer being a copolymer of zero to about 52 mol percent of methyl acrylate, 0.1 to 10 mol percent of acrylic acid, and at least 48 mol percent of amide units selected from the group consisting of those of the general Formulas I and II following:

I
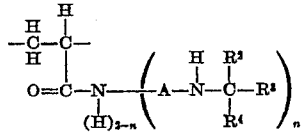

II
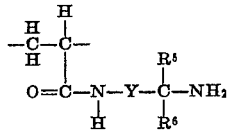

in which:

$R^2$ is an alkyl group of 1 to 24 carbon atoms,
$R^3$ is an alkyl group of 1 to 24 carbon atoms,
$R^4$ is an alkyl group of 1 to 24 carbon atoms,
$n$ is an integer having a value of 1 to 2,
A is an alkylene group of 2 to 10 carbon atoms,
Y is an alkylene group of 1 to 10 carbon atoms,
$R^5$ is an alkyl group of 1 to 18 carbon atoms, and
$R^6$ is an alkyl group of 1 to 18 carbon atoms.

2. A composition as defined in claim 1 in which the amide nitrogen carries a 3-(isopropylamino)propyl substituent.

3. A composition as defined in claim 1 in which the amide nitrogen carries a 3-(t-butylamino)propyl substituent.

4. A composition as defined in claim 1 in which the amide nitrogen carries a 1,2-diamino-2-methyl-propyl substituent.

5. A composition as defined in claim 1 in which the amide nitrogen carries an isopropylaminodecyl substituent.

6. As a composition of matter, a linear polymer containing in the polymer about 48 to about 100 mol percent of N-3-(t-butylamino)propyl acrylamide units, 0.1 to 10 mol percent of acrylic acid units, and about 0 to about 52 mol percent of methyl acrylate units, the main chain of said polymer consisting entirely of carbon atoms.

References Cited in the file of this patent
UNITED STATES PATENTS

| | | |
|---|---|---|
| 2,146,210 | Graves | Feb. 7, 1939 |
| 2,311,548 | Jacobson et al. | Feb. 16, 1943 |
| 2,643,958 | Kleiner et al. | June 30, 1953 |
| 2,675,359 | Schneider | Apr. 13, 1954 |

FOREIGN PATENTS

| | | |
|---|---|---|
| 655,951 | Germany | Jan. 27, 1938 |